US008041695B2

(12) United States Patent
Wang

(10) Patent No.: US 8,041,695 B2
(45) Date of Patent: Oct. 18, 2011

(54) AUTOMATICALLY EXTRACTING DATA FROM SEMI-STRUCTURED DOCUMENTS

(75) Inventor: Yanxin Wang, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/105,365

(22) Filed: Apr. 18, 2008

(65) Prior Publication Data

US 2009/0265313 A1 Oct. 22, 2009

(51) Int. Cl.
*G06F 17/30* (2006.01)
(52) U.S. Cl. ........................................ 707/705
(58) Field of Classification Search ............ 707/609, 707/705, 791, 802, 999.01
See application file for complete search history.

(56) References Cited

U.S. PATENT DOCUMENTS

| 7,197,503 | B2 * | 3/2007 | Palanisamy et al. ........... 1/1 |
| 2003/0140311 | A1 * | 7/2003 | Lemon et al. ............ 715/513 |
| 2004/0205463 | A1 | 10/2004 | Darbie |
| 2005/0108267 | A1 | 5/2005 | Gibson et al. |
| 2009/0030671 | A1 | 1/2009 | Kwon et al. |

FOREIGN PATENT DOCUMENTS

| JP | 200975625 | | 4/2009 |
| KR | 100814079 B | | 3/2008 |
| WO | 0020985 | | 4/2000 |
| WO | 0203210 | A1 | 1/2002 |
| WO | 03014966 | A3 | 2/2003 |
| WO | 2008040046 | A1 | 4/2008 |

OTHER PUBLICATIONS

Pearson Education, Anatomy of an XSLT Stylesheet, Pearson Education 2001, pp. 2-23.*
Gronim et al, Extracting Names from Websites Containing Lists of People, caregie Mellon University, Mar. 31, 2001, pp. 1-20.*
Maly et al, Exploiting Dynamic Validation for Document Layout Classification During Metadata Extraction, IADIS International Conference 2007; pp. 261-268.*
Reference material printed from website address: http://www.PDFlib.com on Jul. 3, 2008, 1 page.
L. Eikvil. Technical Report 945 entitled "Information Extraction from World Wide Web—A Survey," Norweigan Computing Center, Oslo, Norway, dated Jul. 1999; 40 pages.
A.H.F. Laender, B.A. Ribeiro-Neto, A.S. da Silva, and J.S. Teixeira. Abstract entitled "A Brief Survey of Web Data Extraction Tools," SIGMOD Record, 31(2):84-93, dated Jun. 2002; 10 pages.
Omar Alonso, Sandeepan Banerjee, Steve Buxton, Roger Ford, and Richard Pitts, Technical Paper entitled "An Oracle Technical White Paper," dated Apr. 2005; 34 pages.
Tak-Lam Wong, and Wai Lam, Article entitled "Adapting Web Information Extraction Knowledge via Mining Site-Invariant and Site-Dependent Features," vol. 7, Issue 1, Publication date Feb. 2007 in ACM Transactions on Internet Technology.
Search Report for UK Application No. GB0906700.0 dated Aug. 6, 2009.

* cited by examiner

*Primary Examiner* — Fred I Ehichioya
(74) *Attorney, Agent, or Firm* — Hope Baldauff Hartman, LLC

(57) ABSTRACT

This description provides tools and techniques for automatically extracting data from semi-structured documents. A computer-readable storage medium may contain computer-executable instructions that, when executed by a computer, cause the computer to receive a request for data representing an inferred structure of an input document. For the request, the computer may determine whether a repository containing mined information includes the requested data. If the repository contains the requested data, the computer may return the data representing the inferred structure of the input document in response to the request.

20 Claims, 4 Drawing Sheets

AUTOMATICALLY EXTRACTING DATA FROM SEMI-STRUCTURED DOCUMENTS

BACKGROUND

Increasingly, technical information is being stored and transmitted in electronic formats, rather than in "hard" or paper form. Typically, electronic documents containing this technical information may be generated from databases, and captured electronically in these documents for dissemination to various users. While these databases may provide structured storage for this technical information, once this technical information resides in the electronic documents, any underlying structure is typically lost. While it is possible for end users of the electronic documents to attempt to obtain structure information from the owners of the underlying database, this approach may be problematic if these document owners are uncooperative, or if the underlying databases are otherwise unavailable.

SUMMARY

It should be appreciated that this Summary is provided to introduce a selection of concepts in a simplified form that are further described below in the Detailed Description. This Summary is not intended to be used to limit the scope of the claimed subject matter.

This description provides tools and techniques for automatically extracting data from semi-structured documents. These tools and techniques may provide methods that include receiving input documents for processing by a data extraction module, and converting the input documents to a hypertext markup language (HTML) representation that includes HTML tags. These methods may also infer the structures of the input documents based upon the HTML tags, and storing representations of the inferred structures of the input documents.

According to an embodiment, a computer-readable storage medium may contain computer-executable instructions that, when executed by a computer, cause the computer to receive an input document for processing by a data extraction module. The computer may convert the input document to a hypertext markup language (HTML) representation that includes a plurality of HTML tags. The computer may also infer a structure of the input document based upon the HTML representation, and store a representation of the inferred structure of the input document.

According to another embodiment, a computer-readable storage medium may contain computer-executable instructions that, when executed by a computer, cause the computer to send a request for data representing an inferred structure as extracted from an input document. The computer may also receive the data representing the inferred structure of the input document, format the extracted data for presentation, and present the extracted data.

According to another embodiment, a computer-readable storage medium may contain computer-executable instructions that, when executed by a computer, cause the computer to receive a request for data representing an inferred structure of an input document. For this request, the computer may determine whether a repository containing mined information includes the requested data. If the repository contains the requested data, the computer may return the data representing the inferred structure of the input document in response to the request.

The features, functions, and advantages discussed herein may be achieved independently in various embodiments of the present description or may be combined in yet other embodiments, further details of which can be seen with reference to the following description and drawings.

DETAILED DESCRIPTION

Figure 1:
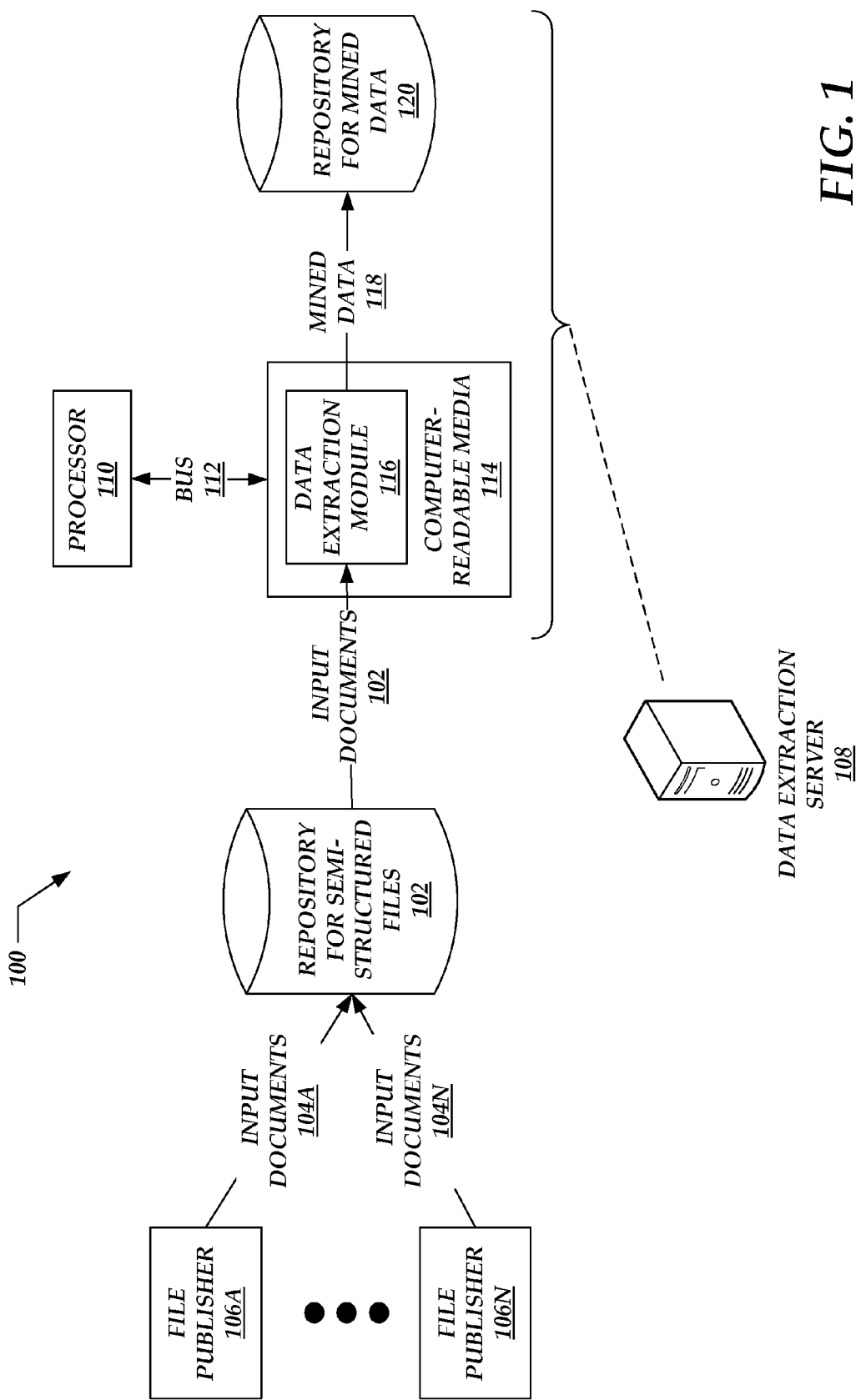
FIG. 1 is a combined block and flow diagram illustrating systems or operating environments for automatically extracting data from semi-structured documents.

The following detailed description discloses various tools and techniques for automatic data extraction from semi-structured documents. This detailed description is understood when read with the several drawing figures referred to herein. These drawing figures include reference numerals to facilitate mapping items in the description to items in the drawings. The first digit of these reference numerals indicate the drawing in which the corresponding item first appears.

FIG. 1 illustrates systems or operating environments, denoted generally at 100, for automatic data extraction from semi-structured documents. These systems 100 may include one or more repositories 102 that store input semi-structured documents or files 104a and 104n (collectively, input documents 104), as provided respectively by one or more file publishers 106a and 106n (collectively, file publishers 106). Examples of the input documents 104 may include, but are not limited to, relatively large technical manuals, legal documents, product descriptions, or the like. More specific examples might include engineering manuals that specify repair procedures (e.g., in the aviation context, procedures for repairing, servicing, or refurbishing parts or assembled systems from aircraft), that provide technical information in tabular form, or the like.

The input documents 104 may be semi-structured in the sense that they typically include a table of contents, indexes, or other forms of organization, thus, the term "semi-structured." The first two documents that fall somewhere between two extremes, with one extreme referring to a fully structured database record, and the other extreme referring to completely unstructured documents. Examples of these semi-structured documents may include parts catalogs, maintenance manuals, service documents, or the like. In some cases, these documents may be generated from databases, with manual processes refining the format or layout of these documents. Examples of the latter scenarios may include telephone books, directory listings, or the like, as well as the examples provided above.

In some implementations, these input documents 104 may be published in the portable document format (PDF) created by Adobe Systems Incorporated of San Jose, Calif. However, implementations of the systems 100 may operate with other equivalent or similar document formats. Typically, these formats are assigned more for ease of portability and exchange between a variety of different operating environments and application programs, or are not well-adapted for searching, indexing, or otherwise locating information within these documents. In cases where these documents include dozens or hundreds of pages, it can be time consuming and laborious to scroll through such lengthy documents to locate particular information.

The systems 100 may include one or more data extraction systems 108, which may be housed in one or more server systems, as shown in the example provided in FIG. 1. Turning to the data extraction systems 108 in more detail, these systems may include one or more processors 110, which may have a particular type or architecture, chosen as appropriate for particular implementations. The processors 110 may couple to one or more bus systems 112 that are chosen for compatibility with the processors 110.

The data extraction systems 108 may include one or more instances of computer-readable storage media 114, which couple to the bus systems 112. The bus systems 112 may enable the processors 110 to read code and/or data to/from the computer-readable storage media 114. The media 114 may represent storage elements implemented using any suitable technology, including but not limited to semiconductors, magnetic materials, optics, or the like. The media 114 may include memory components, whether classified as RAM, ROM, flash, or other types, and may also represent hard disk drives.

The storage media 114 may include one or more modules of instructions that, when loaded into the processor 110 and executed, cause the system 108 to provide data extraction services. These modules may implement the various algorithms and techniques described and illustrated herein. For example, a data extraction module 116 may retrieve one or more input semi-structured documents (represented generally at 104) from the repository 102, and may mine or extract structure-related information 118 from these documents.

In turn, these operating environments 100 may include a repository 120 for storing this information as mined or extracted from the input documents 104. While FIG. 1 shows examples in which the repository 120 resides within the data extraction server 108, it is noted that in some implementations, the repository 120 may not be housed locally on the data extraction server 108. Instead, the repository 120 may reside on another server, and made accessible to the server 108 over, for example, a suitable communications network. In addition, the repository 120 may or may not be stored in the computer-readable media 114.

Having described the overall systems 100, the discussion now proceeds to a description of process flows for automatically extracting structure-related data from the input documents. This discussion is now presented with FIG. 2.

Figure 2:
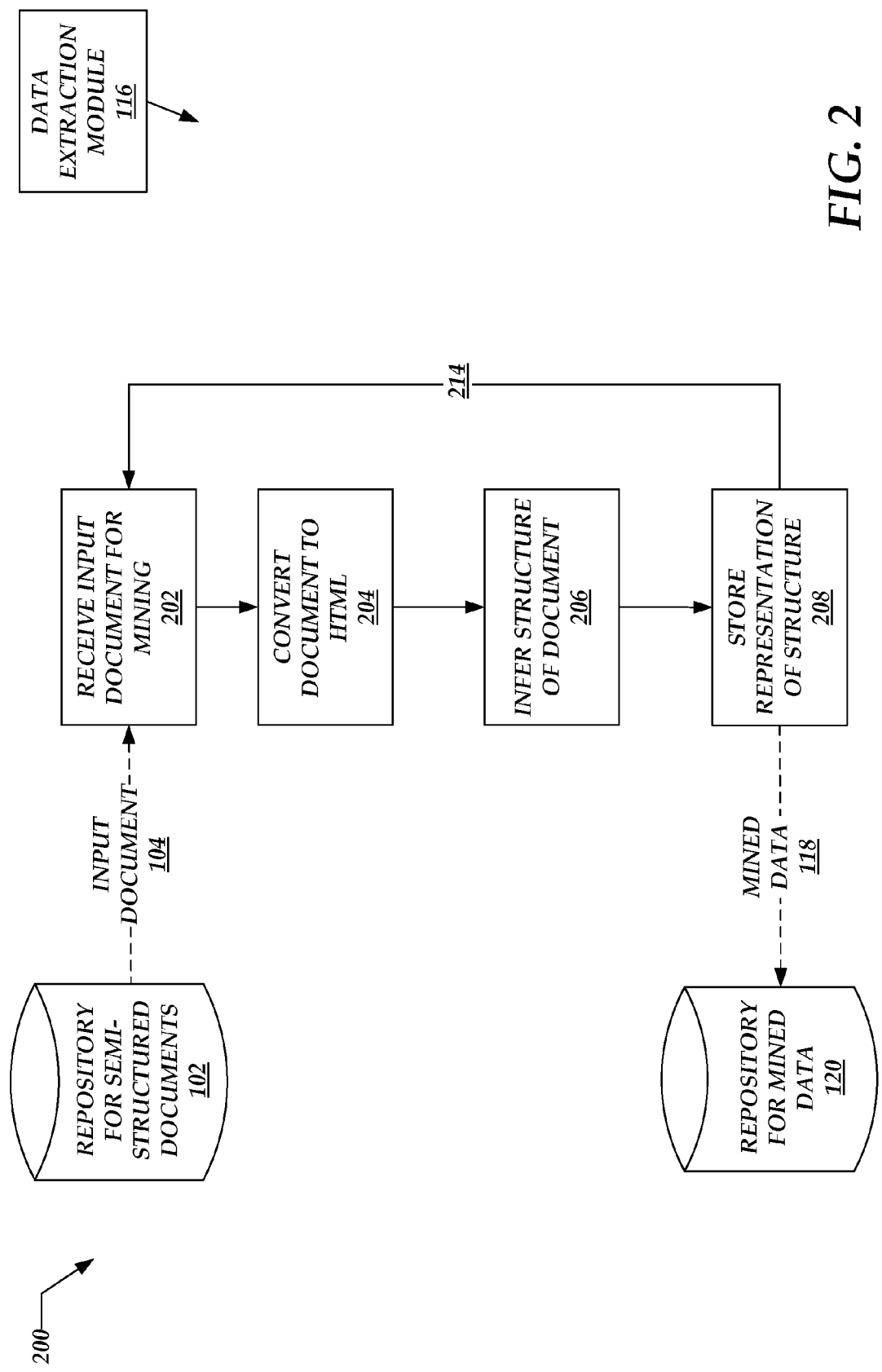
FIG. 2 is a flow diagram illustrating processes for automatically extracting structure-related data from input documents.

FIG. 2 illustrates process flows, denoted generally at 200, for automatically extracting structure-related data from the input documents. For conciseness of description and reference, not to limit possible implementations, FIG. 2 may carry forward certain items described previously, as labeled by identical reference numbers. For example, FIG. 2 carries forward the data extraction module 116, and the repositories 102 and 120. While the process flows 200 are described in connection with the data extraction module 116, it is noted that other components may perform at least portions of these process flows 200 without departing from the scope and spirit of this description.

Turning to the process flows 200 in more detail, block 202 generally represents receiving a given input document for extraction and mining. FIG. 2 carries forward an example input document at 104, and block 202 may include receiving these input files from the repository 102. In some implementations, block 202 may include receiving input files in .pdf format. In other implementations, block 202 may include receiving input files in other formats.

Block 204 generally represents converting the input document into hypertext markup language (HTML). HTML documents may include a plurality of tags that convey information contained in the underlying document. For the purposes of this description, the markup tags may specify or contain not only content information, but also may contain information relating to the structure of the document. Thus, this description may refer to these markup tags as "enriched". These enriched HTML tags may also indicate where in the document given content occurs, and may also indicate and preserve how this given content relates to other content within the document.

Block 206 generally represents inferring the structure of the input document, based on patterns occurring within the enriched HTML tags from block 204. More specifically, patterns of tags may indicate where content occurs within the input document. For example, lines of text within the input document may be associated with a recurring pattern of HTML tags (e.g., a tag for the left margin of the line, one or more tags for text or images occurring within the lines, and a tag for the right margin of the line). Consecutive lines occurring within the input document may be represented by HTML tags that exhibit similar repeating patterns. For example, these consecutive lines may share common left margins and right margins, thereby suggesting that these consecutive lines represent content arranged in a vertical list or column.

In an example application of the tools and techniques described herein, a given input document may list a sequence of parts used during a given repair procedure, along with support equipment used in various origins of the repair procedure. Along with the foregoing, the input document may also list tasks or subtasks involved in the repair procedure. The input document may list this information in tables or columns, along with the portions of the procedure that use particular parts. In turn, the HTML tags for these tables and columns may exhibit recurring patterns. In this example, block 206 may include detecting similarities among these tables and columns, and inferring that similar entries within tables or columns may be related to one another and structured in some way. More specifically, block 206 may include inferring that particular subtasks within the repair procedure may utilize corresponding parts.

Block 208 generally represents storing representations of mined data (e.g., 118) in a suitable repository (e.g., 120). This mined data 118 may include structure-related information, as inferred in block 206. For example, block 208 may include relating data elements or data items extracted from the input document 104 with one another. Continuing the previous examples, for instance, block 208 may include relating representations of tasks or subtasks involved in a given repair procedure with representations of support equipment, parts, or other items involved with these tasks or subtasks.

It is noted that the process flows 200 may be performed for any number of input documents 104, and that FIG. 2 illustrates one iteration of these process flows for convenience only. More specifically, the process flows 200 may be repeated for any number of input documents in the repository 102, as represented generally by the arrow 210.

Having described the process flows 200 for automatically extracting structure-related data from the input documents, the discussion now turns to a description of operating environments or systems that allow client systems to access the extracted structure-related data. This description is now provided with FIG. 3.

Figure 3:
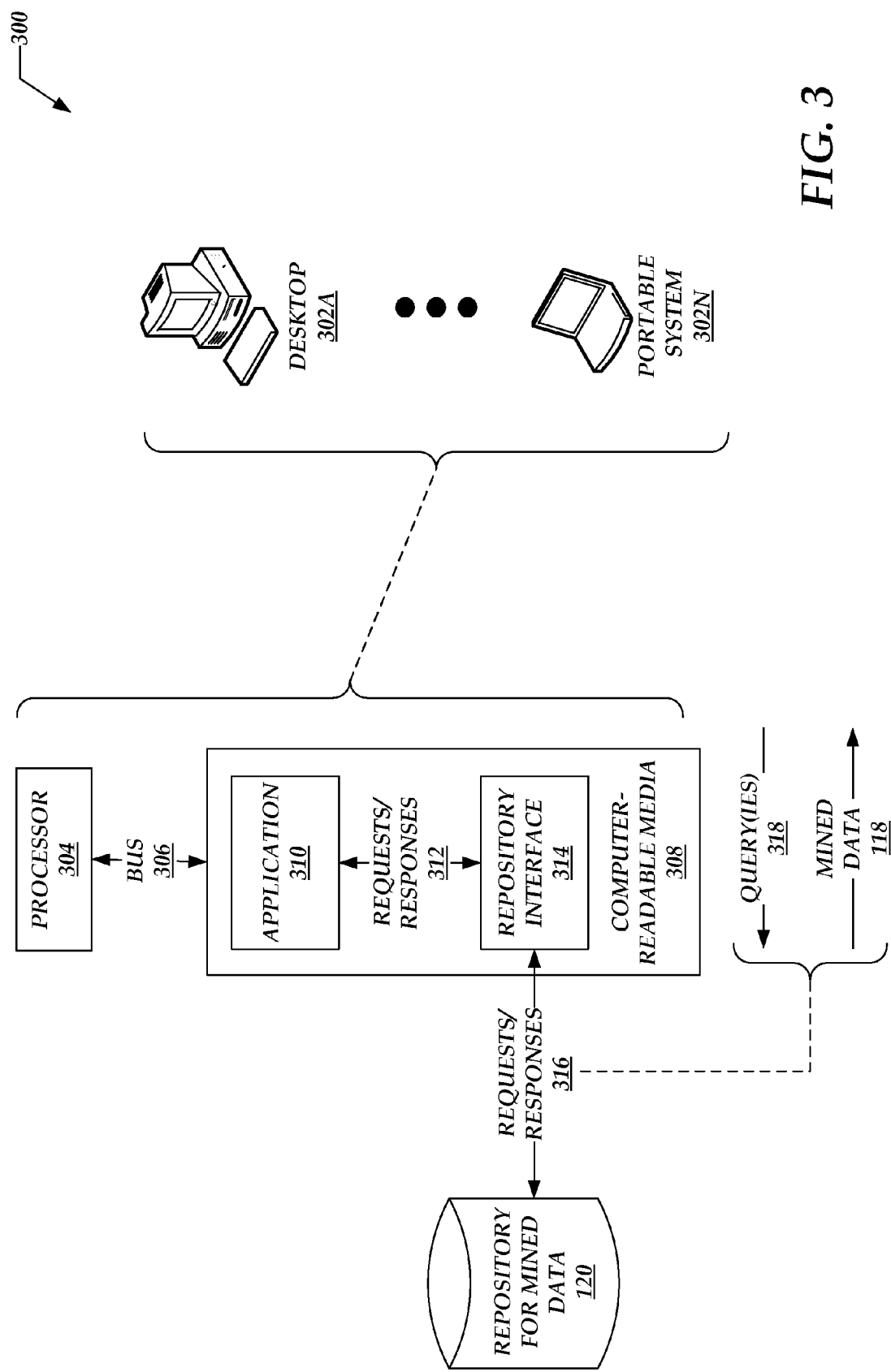
FIG. 3 is a combined block and flow diagram illustrating client devices configured as described herein to access extracted structure related data.

FIG. 3 illustrates client devices, denoted generally at 300, configured as described herein to access the extracted structure-related data. For conciseness of description and reference, not to limit possible implementations, FIG. 3 may carry forward certain items described previously, as labeled by identical reference numbers. For example, FIG. 3 carries forward an example repository 120 that stores structure-related information that was mined from semi-structured input documents.

FIG. 3 provides two examples of client devices or systems, including a politically stationary desktop system 302a and a portable system 302n (whether characterized as a laptop, notebook, or other type of mobile computing system), referred to collectively as client systems 302. Implementations of this description may include other types of client devices or systems as well, with FIG. 3 providing non-limiting examples. For example, implementations may include other client devices, including but not limited to wireless personal digital assistants, smartphones, or the like. The graphical elements used in the Figures herein to depict various components are chosen only to facilitate illustration, and not to limit possible implementations of this description.

Turning to the client system 302 in more detail, these client systems may include one or more processors 304, which may have a particular type or architecture, chosen as appropriate for particular implementations. The processors 304 in the client systems may or may not be the same type and architecture as the processors 110 shown in FIG. 1. The processors 304 may couple to one or more bus systems 306 that are chosen for compatibility with the processors 304. The bus systems 306 may or may not be of the same type and/or architecture as the bus systems 112 shown in FIG. 1.

The client systems 302 may include one or more instances of computer-readable storage media 308, which couple to the bus systems 306. The bus systems 306 may enable the processors 304 to read code and/or data to/from the computer-readable storage media 308. The media 308 may represent storage elements implemented using any suitable technology, including but not limited to semiconductors, magnetic materials, optics, or the like. The media 308 may include memory components, whether classified as RAM, ROM, flash, or other types, and may also represent hard disk drives.

The storage media 308 may include one or more modules of instructions that, when loaded into the processor 304 and executed, cause the client systems 302 to access structure-related data that was automatically extracted from one or more input semi-structured documents. These modules may perform various algorithms and techniques that are described and illustrated as being performed by the client systems. For example, the computer-readable media 308 may include one or more applications 310, which may represent word processing applications, spreadsheet applications, database applications, applications related to managing workflows, or the like.

In example implementations, the applications 310 may generate requests for the structured information, and may receive responses to these requests. FIG. 3 denotes the requests and responses generally at 312.

The computer-readable media 308 may include a module 314 that serves as an interface to the repository 120. For example, assuming that the repository 120 is implemented as a suitable database, the interface 314 may provide a set of methods or application program interfaces (APIs) for querying this repository in response to requests from the applications 310. In addition, the interface 314 may receive responses from the repository, and format them as appropriate for presentation to the requesting application 310. FIG. 3 generally represents at 316 these requests and responses as they pass between the interface 314 and the repository 120. More specifically, these requests and responses 316 may include a number of queries 318 passing from the interface to the repository, as well as mined data 118 returned by the repository in response to these queries.

Having described the client devices configured to access the extracted structure-related data from the repository, the discussion now proceeds to process flows for extracting the structure-related data. This description is now provided with FIG. 4.

Figure 4:
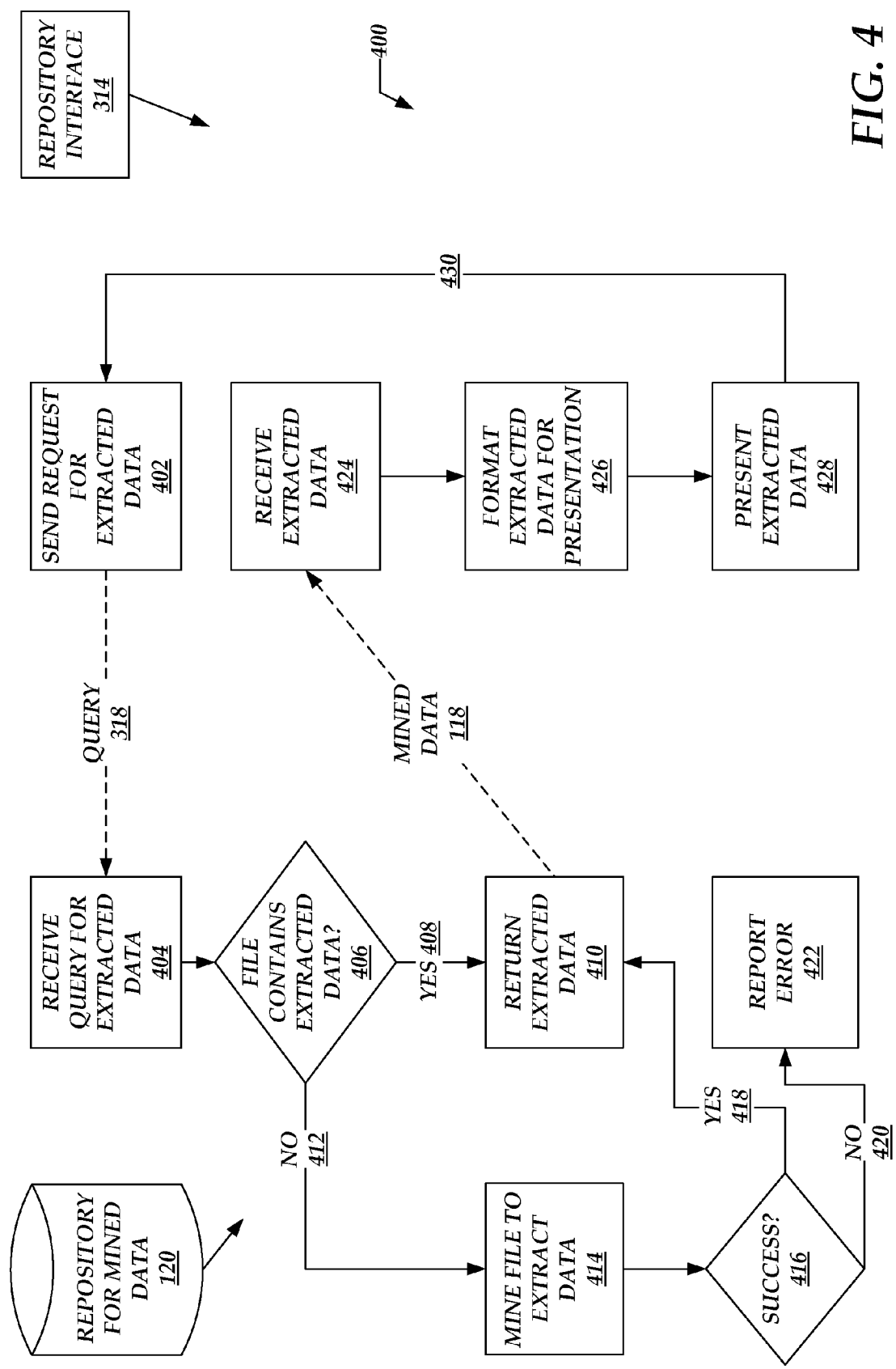
FIG. 4 is a flow diagram illustrating processes by which the client devices may access structure-related data that was automatically extracted from the input documents.

FIG. 4 illustrates process flows, denoted generally at 400, by which client devices may access structure-related data that was automatically extracted from semi-structured input documents. For conciseness of description and reference, not to limit possible implementations, FIG. 4 may carry forward certain items described previously, as labeled by identical reference numbers. For example, FIG. 4 carries forward the repository interface 314, and the repository 120. While the process flows 400 are described in connection with the repository interface 314 and the repository 120, it is noted that other components may perform at least portions of these process flows 400 without departing from the scope and spirit of this description.

Turning to the process flows 400 in more detail, block 402 generally represents sending a request or query (e.g., 318) for extracted data to the repository 120. For example, the repository interface 314 may perform block 402 in response to requests received from one or more client applications (e.g., 310). Returning to the above examples involving repair procedures, block 402 may include sending a query for any extracted data pertaining to a given repair procedure. As another non-limiting example, in a customer service scenario, block 402 may include requesting any extracted data pertaining to a given item or service about which a customer is inquiring.

At the repository 120, block 404 generally represents receiving the query (e.g., 318) for extracted data. In turn, decision block 406 generally represents determining whether the repository contains any extracted data that is responsive to the input query. If the repository contains data responsive to the query, the process flows 400 may take Yes branch 408 to block 410, which represents returning any response of extracted data to the requesting repository interface. FIG. 4 provides an example of such extracted data as mined data 118.

Returning to decision block 406, if the repository does not contain any extracted data responsive to the input query, the process flows 400 may take No branch 412 to block 414. Block 414 generally represents mining one or more input semi-structured files in an effort to locate data responsive to the input query. For example, block 414 may include invoking the process flows 200 shown in FIG. 2 to extract or mine structure-related information from one or more of these input documents. In turn, block 414 may also include updating the repository 120 with the results of such mining or extraction processes.

Decision block 416 generally represents determining whether block 414 produced any extracted or mined data responsive to the input query. If so, the process flows 400 may take Yes branch 418 to block 410, which was described above.

Returning to decision block 416, if block 414 failed to produce any extracted or mined data responsive to the input query, the process flows 400 may take No branch 420 to block 422. Block 422 generally represents reporting an error message or otherwise indicating that the repository 120 does not contain data responsive to the input query. Block 422 may include communicating this message back to the repository interface 314, although to promote clarity, FIG. 4 omits this message flow and related processing by the repository 120 and repository interface 314.

At the repository interface 314, block 424 generally represents receiving the extracted or mined data 118. In turn, block 426 generally represents arranging or formatting the extracted data for presentation to one or more users via the applications 310. For example, returning to the example of repair procedures discussed above, block 426 may include arranging representations of particular repair procedures so that these representations appear near any support equipment, parts lists, or step descriptions associated with the procedures. More generally, block 426 may include associating different elements of the extracted structure-related data with one another, so as to indicate structure or relationships among different instances of this data.

Block 428 generally represents presenting representations of the extracted data, as formatted or arranged in block 426. In turn, the process flows 400 may return to block 402 to await the next request for extracted data, as represented generally at 430.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A computer-readable storage medium having computer-executable instructions stored thereon which, when executed by a computer, cause the computer to perform a method comprising:
   receiving an input document for processing by a data extraction module;
   converting the input document to a hypertext markup language (HTML) representation that includes a plurality of HTML tags;
   detecting a recurring pattern of HTML tags within the input document;
   inferring a structure of the input document comprising a relationship between content sections in the input document based on the recurring pattern of HTML tags; and
   storing a representation of the inferred structure of the input document.

2. The storage medium of claim 1, wherein the instructions for receiving at least one input document include instructions for receiving a document that is in a portable document format (PDF).

3. The storage medium of claim 1, wherein the instructions for receiving at least one input document include instructions for receiving a semi-structured input document.

4. The storage medium of claim 1, wherein the instructions for receiving at least one input document include instructions for receiving an input document that describes repair procedures for at least one assembly or subsystem for installation in an aircraft.

5. The storage medium of claim 1, wherein the recurring pattern of HTML tags comprises HTML tags for listing the content sections in tables and columns.

6. The storage medium of claim 1, wherein the relationship between the content sections in the input document comprises a relationship between a particular subtask of a repair procedure and parts utilized in the repair procedure.

7. A computer-readable storage medium having computer-executable instructions stored thereon which, when executed by a computer, cause the computer to perform a method comprising:
   sending at least one request for data representing an inferred structure as extracted from an input document, wherein the inferred structure is based on relationships between content sections in the input document inferred from recurring patterns of HTML tags;
   receiving the extracted data representing the inferred structure of the input document;
   formatting the extracted data for presentation; and
   presenting the extracted data.

8. The storage medium of claim 7, wherein the the extracted data is related to repair procedures for at least one assembly or subsystem for installation in an aircraft.

9. The storage medium of claim 7, wherein the instructions for formatting the extracted data include instructions for associating different elements of the inferred structure with one another.

10. The storage medium of claim 7, wherein the recurring patterns of HTML tags comprises HTML tags for listing the content sections in tables and columns.

11. The storage medium of claim 7, wherein the relationships between the content sections in the input document comprises a relationship between a particular subtask of a repair procedure and parts utilized in the repair procedure.

12. A computer-readable storage medium having computer-executable instructions stored thereon which, when executed by a computer, cause the computer to perform a method comprising:
   receiving at least one request for data representing an inferred structure of an input document, wherein the inferred structure is based on relationships between content sections in the input document inferred from recurring patterns of hypertext markup language (HTML) tags in the input document;
   for at least the request, determining whether a repository containing mined information includes the requested data; and
   returning the data representing the inferred structure of the input document in response to the request.

13. The storage medium of claim 12, further comprising instructions for receiving at least a further request for data representing an inferred structure of an input document and determining that the repository does not contain mined information responsive to the further request.

14. The storage medium of claim 13, further comprising instructions for mining the input document in response to the further request, and for updating the repository to incorporate further mined information extracted from the input document.

15. The storage medium of claim 14, further comprising instructions for determining whether the further mined information is responsive to the further request.

16. The storage medium of claim 15, further comprising instructions for returning the further mined information, in response to determining that the further mined information is responsive to the further request.

17. The storage medium of claim 12, wherein the instructions for receiving at least one request include instructions for seeding a request for data representing an inferred structure of an input document related to repair procedures for at least one assembly or subsystem for installation in an aircraft.

18. The storage medium of claim 12, wherein the instructions for receiving at least one request include instructions for receiving a request for data representing an inferred structure of an input PDF document.

19. The storage medium of claim 12, wherein the recurring patterns of HTML tags comprises HTML tags for listing the content sections in tables and columns.

20. The storage medium of claim 12, wherein the relationships between the content sections in the input document comprises a relationship between a particular subtask of a repair procedure and parts utilized in the repair procedure.

* * * * *